United States Patent
Murata et al.

(10) Patent No.: US 10,710,471 B2
(45) Date of Patent: Jul. 14, 2020

(54) METHOD AND FOAM DIE FOR MANUFACTURING SEAT CUSHION MATERIAL

(71) Applicant: TOYOTA BOSHOKU KABUSHIKI KAISHA, Aichi-ken (JP)

(72) Inventors: Yoshiyuki Murata, Aichi-ken (JP); Tomohiro Sakashita, Aichi-ken (JP); Kensuke Inuzuka, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 122 days.

(21) Appl. No.: 15/950,888

(22) Filed: Apr. 11, 2018

(65) Prior Publication Data
US 2018/0297490 A1   Oct. 18, 2018

(30) Foreign Application Priority Data

Apr. 14, 2017   (JP) ................................. 2017-080498

(51) Int. Cl.
*A47C 7/18*   (2006.01)
*B29C 44/06*   (2006.01)
(Continued)

(52) U.S. Cl.
CPC ............ *B60N 2/0284* (2013.01); *A47C 5/125* (2013.01); *A47C 7/185* (2013.01); *B29C 43/18* (2013.01);
(Continued)

(58) Field of Classification Search
CPC .. A47C 5/12; A47C 5/125; A47C 7/18; A47C 7/185; A47C 7/20; B29C 44/04;
(Continued)

(56) References Cited

U.S. PATENT DOCUMENTS 4,190,697 A    2/1980  Ahrens
5,342,569 A *  8/1994  Murasaki ........... A44B 18/0076
                                          264/259

(Continued)

FOREIGN PATENT DOCUMENTS

CN         1785646       6/2006
CN       102015237       4/2011
(Continued)

OTHER PUBLICATIONS

Chinese Office Action in related Chinese application No. 201810330229.X dated Nov. 4, 2019 (along with English-language translation thereof).

(Continued)

*Primary Examiner* — Michael A Tolin
(74) *Attorney, Agent, or Firm* — Greenblum & Bernstein, P.L.C.

(57) ABSTRACT

A method for manufacturing a seat cushion material, the seat cushion material including a front layer part and a back layer part having a back side surface, the method including: preparing for molding the seat cushion by attaching the back layer part to an upper die having an upper cavity surface; molding the seat cushion material by adding foamed resin raw material forming on a lower cavity surface of a lower die and then by closing the upper die to which the back layer part is attached, the lower cavity surface being provided with a plurality of protrusions which is configured to be brought into contact with a seating surface side of the back layer part and press the back layer part against the upper cavity surface when the upper die to which the back layer part is attached is closed; and demolding the molded seat cushion material.

5 Claims, 10 Drawing Sheets (51) Int. Cl.

| | | |
|---|---|---|
| *B29C 44/12* | (2006.01) | |
| *B32B 5/20* | (2006.01) | |
| *B60N 2/62* | (2006.01) | |
| *B60N 2/02* | (2006.01) | |
| *B60N 2/70* | (2006.01) | |
| *B60N 2/36* | (2006.01) | |
| *A47C 5/12* | (2006.01) | |
| *B32B 5/32* | (2006.01) | |
| *B29C 43/18* | (2006.01) | |
| *B29C 44/14* | (2006.01) | |
| *B29C 44/56* | (2006.01) | |
| *B29K 623/00* | (2006.01) | |
| *B29K 105/24* | (2006.01) | |
| *B29L 31/58* | (2006.01) | |
| *B29C 44/58* | (2006.01) | |
| *B29K 75/00* | (2006.01) | |
| *B29L 31/00* | (2006.01) | |

(52) U.S. Cl.
CPC .......... *B29C 44/06* (2013.01); *B29C 44/1233* (2013.01); *B29C 44/1285* (2013.01); *B29C 44/146* (2013.01); *B29C 44/569* (2013.01); *B32B 5/32* (2013.01); *B60N 2/36* (2013.01); *B60N 2/7017* (2013.01); *B29C 44/1271* (2013.01); *B29C 44/148* (2013.01); *B29C 44/583* (2013.01); *B29K 2075/00* (2013.01); *B29K 2105/24* (2013.01); *B29K 2623/06* (2013.01); *B29K 2623/12* (2013.01); *B29K 2995/0063* (2013.01); *B29L 2031/58* (2013.01); *B29L 2031/771* (2013.01); *B32B 5/20* (2013.01)

(58) Field of Classification Search
CPC ..... B29C 44/0461; B29C 44/06; B29C 44/12; B29C 44/1233; B29C 44/1271; B29C 44/128; B29C 44/1285; B29C 44/569; B29C 44/58; B29C 44/583; B29K 2075/00; B29K 2105/04; B29K 2623/06; B29K 2623/12; B29K 2995/0063; B29L 2031/58; B29L 2031/771; B32B 5/20; B32B 5/32; B32B 7/02; B60N 2/62; B60N 2/7017; B60N 2/7035

See application file for complete search history.

(56) References Cited

U.S. PATENT DOCUMENTS

| | | | | |
|---|---|---|---|---|
| 8,360,530 | B2 * | 1/2013 | Onoda | B60N 2/646 |
| | | | | 297/452.21 |
| 9,221,199 | B2 * | 12/2015 | Kuo | B29C 41/04 |
| 2010/0133891 | A1 | 6/2010 | Onoda et al. | |

FOREIGN PATENT DOCUMENTS

| | | |
|---|---|---|
| CN | 102689607 | 9/2012 |
| CN | 104643684 | 5/2015 |
| CN | 104708750 | 6/2015 |
| CN | 104802359 | 7/2015 |
| CN | 108145899 | 6/2018 |
| DE | 4320602 | 5/1994 |
| EP | 0242152 | 10/1987 |
| FR | 2615714 | 12/1988 |
| JP | 2009291537 | 12/2009 |
| JP | 2010-125138 | 6/2010 |

OTHER PUBLICATIONS

German Office Action in counterpart application No. DE 102018205422.3, dated Dec. 17, 2018 (along with English-language translation).

* cited by examiner

FIG.14

METHOD AND FOAM DIE FOR MANUFACTURING SEAT CUSHION MATERIAL

CROSS-REFERENCE TO RELATED APPLICATIONS

This application claims priority from Japanese Patent Application No. 2017-080498 filed on Apr. 14, 2017, the entire contents of which are incorporated herein by reference.

TECHNICAL FIELD

The disclosure relates to a method and a foam die for manufacturing a seat cushion material constituting a vehicle seat.

BACKGROUND

A pad body having a two-layer structure is known as a cushion material for a vehicle seat. JP-A-2010-125138 discloses a pad body having a two-layer structure in which a front layer pad on a seating surface side is an urethane foam obtained by foam-molding a polyurethane resin and a back layer pad disposed on the side of the front layer pad opposite to the seating surface is a foamed body obtained by foam-molding AS resin (copolymer of styrene and acrylonitrile).

Typically, a die is used for manufacturing the pad body. The die has an upper die and a lower die, and a cavity corresponding to a shape of the pad body is formed between the upper die and the lower die when the upper die is closed with respect to the lower die. A cavity surface of the lower die is formed in a shape corresponding to a shape of a front surface portion side (seating surface side) of the pad body, and a cavity surface of the upper die is formed in a shape corresponding to a shape of a back surface portion side (side opposite to the seating surface) of the pad body. Further, in a state where the back surface of the two-layered pad is temporarily held on the cavity surface of the upper die by mechanical fitting or magnetic force or the like acting between a magnet embedded in the cavity surface of the upper die and an iron member inserted in the two-layered pad, the pad body is manufactured by pouring foamed polyurethane resin raw material onto the cavity surface of the lower die, closing the upper die with respect to the lower die, and performing foam-molding.

In the method for manufacturing the pad body having the two-layered structure disclosed in JP-A-2010-125138, there is a problem that a part of the foamed polyurethane resin raw material intrudes between the cavity surface of the upper die and the back surface of the back layer pad from an end portion of the back surface of the back layer pad in contact with the cavity surface of the upper die and the part is foamed and cured therein in the process of foaming and curing the foamed polyurethane resin raw material. When the part of the foamed polyurethane resin raw material intrudes between the cavity surface of the upper die and the back surface of the back layer pad and the part is foamed and cured therein, a mounting surface of the pad body to a vehicle body and the back surface of the back layer pad do not come into close contact with each other, and a height of the seating surface is deviated from a design value. When attempting to remove the foamed body formed on the back surface of the back layer pad in order to avoid such a situation, there is a problem that the number of working steps is increased.

SUMMARY

An object is to provide a method and a foam die capable of manufacturing a seat cushion material in which a front layer pad and a back layer pad which is disposed on the side of the front layer pad opposite to a seating surface and which has a lower density than the front layer pad are integrated while suppressing an increase in the number of working steps.

An aspect of the present disclosure is a method for manufacturing a seat cushion material, the seat cushion material including a front layer part disposed on a seating surface side, and a back layer part disposed on a side of the front layer part opposite to the seating surface and having a higher rigidity and a lower density than the front layer part, the seat cushion material having a layered structure in which the front layer part and the back layer part are integrated, and the back layer part having a back side surface constituting at least a part of the surface on the side of the seat cushion material opposite to the seating surface, the method including: preparing for molding the seat cushion by attaching the back layer part to an upper die having an upper cavity surface corresponding to the surface on the side of the seat cushion material opposite to the seating surface in such a manner that the back side surface is brought into contact with the upper cavity surface; molding the seat cushion material by adding foamed resin raw material forming the front layer part on a lower cavity surface of a lower die, and then by closing the upper die to which the back layer part is attached so as to integrate the front layer part with the back layer part, the lower cavity surface of the lower die corresponds to the surface on the seating surface side of the seat cushion material and the lower cavity surface is provided with a plurality of protrusions which is configured to be brought into contact with the seating surface side of the back layer part and is configured to press the back layer part against the upper cavity surface when the upper die to which the back layer part is attached is closed with respect to the lower die; and demolding the molded seat cushion material.

BRIEF DESCRIPTION OF DRAWINGS

FIG. 8 is a sectional view of a section corresponding to FIG. 4, showing a die for molding the seat cushion material according to the above embodiment. FIG. 8 shows a state in which a cavity is hollow;

FIG. 9 is a sectional view of the section corresponding to FIG. 4, showing the die for molding the seat cushion material according to the above embodiment. FIG. 9 shows a state in which a back layer part is attached to an upper die;

FIG. 10 is a sectional view of the section corresponding to FIG. 4, showing the die for molding the seat cushion material according to the above embodiment. FIG. 10 shows a state in which the seat cushion material is molded;

FIG. 11 is a sectional view of a section corresponding to FIG. 5, showing the die for molding the seat cushion material according to the above embodiment. FIG. 11 shows a state in which the seat cushion material is molded;

FIG. 14 is a sectional view of a section corresponding to FIG. 6, showing the die for molding the seat cushion material according to the above embodiment. FIG. 14 shows a state in which the seat cushion material is molded.

DETAILED DESCRIPTION

A seat cushion material manufactured by a manufacturing method and a foam molding die according to an embodiment of the disclosure will be described with reference to FIGS. 1 to 7. In each of the figures, respective directions of an automobile when a seat cushion frame is mounted on a floor of the automobile are indicated by arrows. In the following, the description relating to directions is made with reference to these directions.

Figure 1:
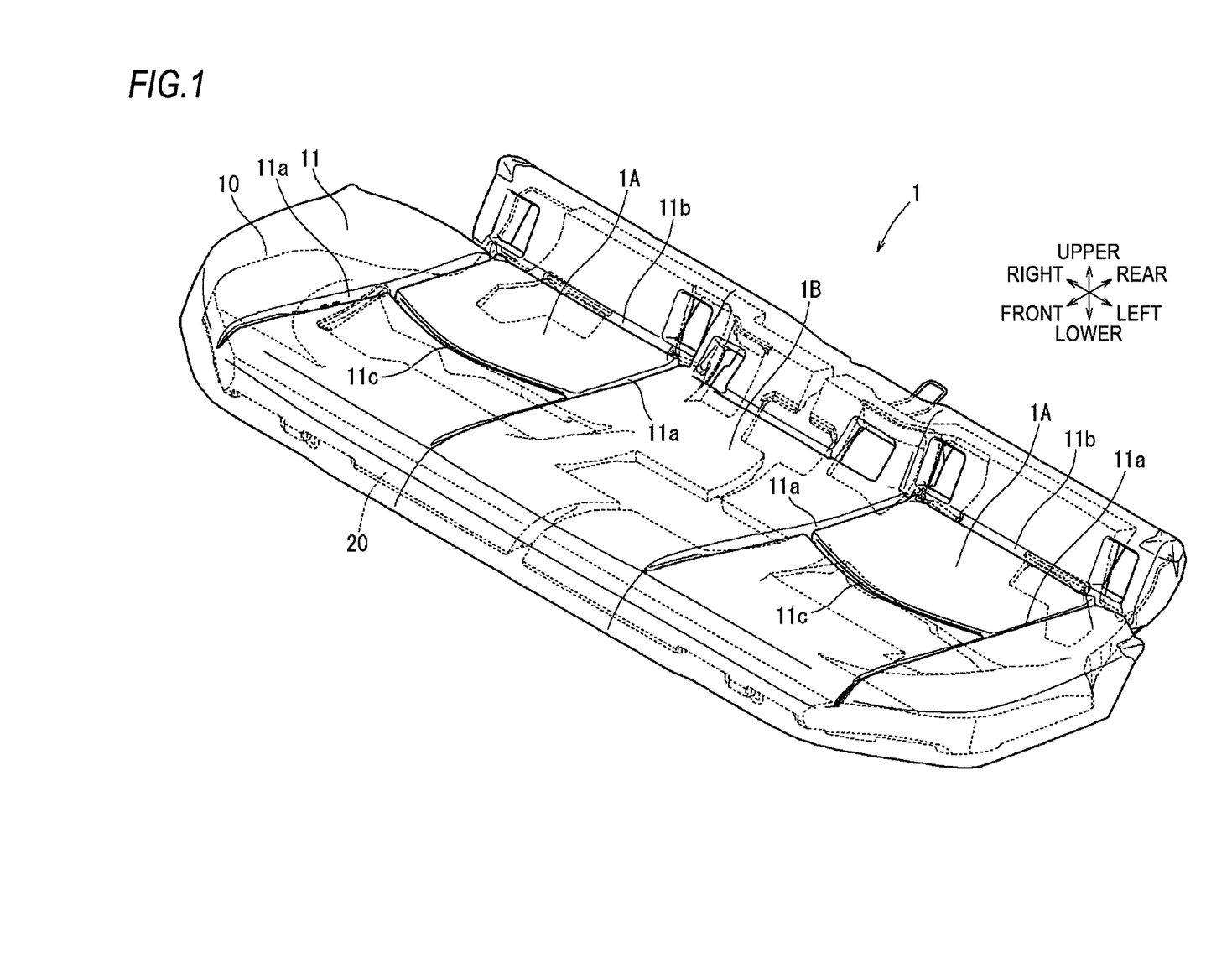
FIG. 1 is a perspective view of a seat cushion material manufactured by a manufacturing method and a foam molding die according to an embodiment of the disclosure.

FIG. 1 shows a cushion pad 1 that is a seat cushion material manufactured by a manufacturing method and a foam molding die according to the disclosure. The cushion pad 1 is used for a seat cushion of a three-seat bench seat and has a length in a left and right direction that is substantially the same as a width of a cabin. A cushion cover (not shown) that covers the surface of the cushion pad 1 is covered on the cushion pad 1 to form a seat cushion. Further, a seat back (not shown) having the same configuration is assembled in a state of being erected on a rear end portion of the seat cushion and is attached to a cabin floor to form a rear seat. Here, the cushion pad 1 corresponds to the "seat cushion material" in the claims.

As shown in FIGS. 1 to 7, the cushion pad 1 includes a pair of left and right seating parts 1A, and a center seating part 1B disposed between the left and right seating parts 1A. Further, the cushion pad 1 includes a front layer pad 10 disposed on the front side that is a seating surface side, and a back layer pad 20 disposed on the back side that is a lower side of the front layer pad 10. Here, the front layer pad 10 corresponds to the "front layer part" and the back layer pad 20 corresponds to the "back layer part" in the claims.

Figure 3:
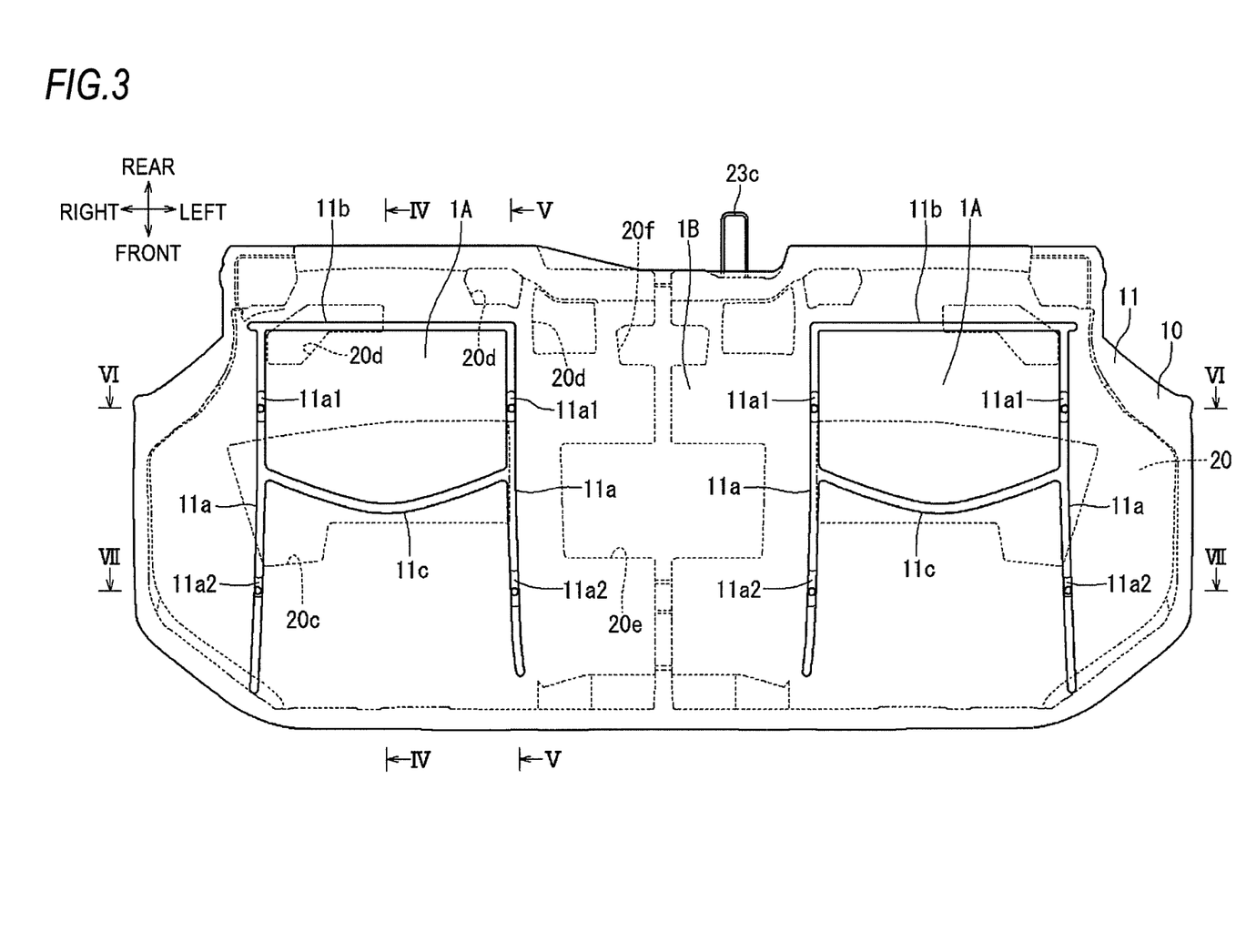
FIG. 3 is a plan view of the seat cushion material according to the above embodiment.
Figure 4:
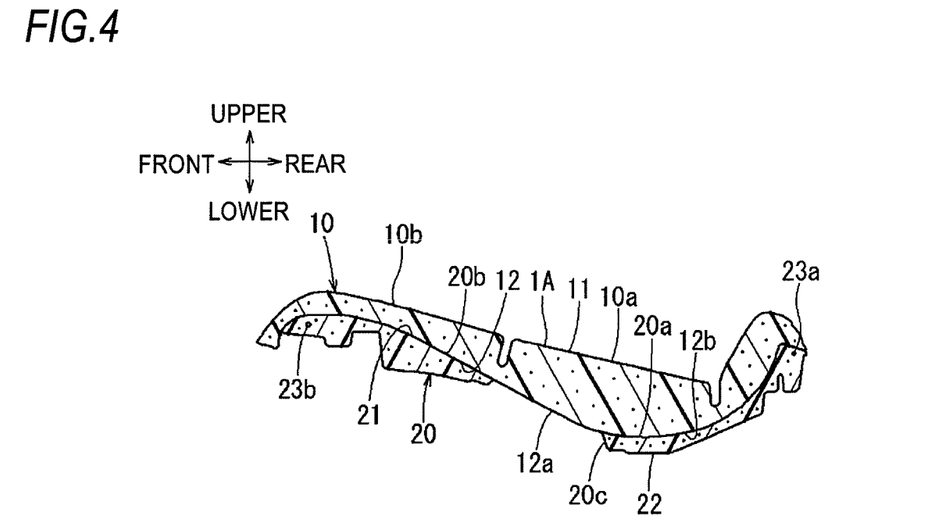
FIG. 4 is a sectional view taken along the line IV-IV in FIG. 3.
Figure 5:
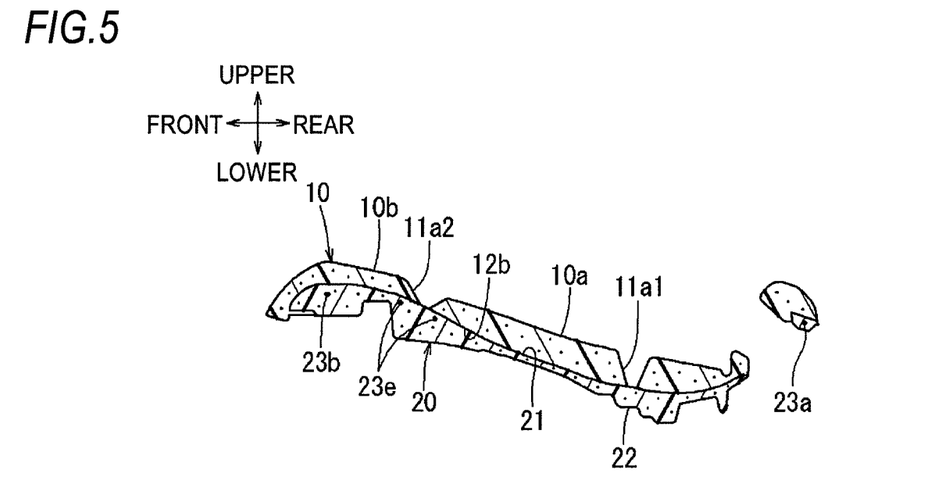
FIG. 5 is a sectional view taken along the line V-V in FIG. 3.
Figure 6:
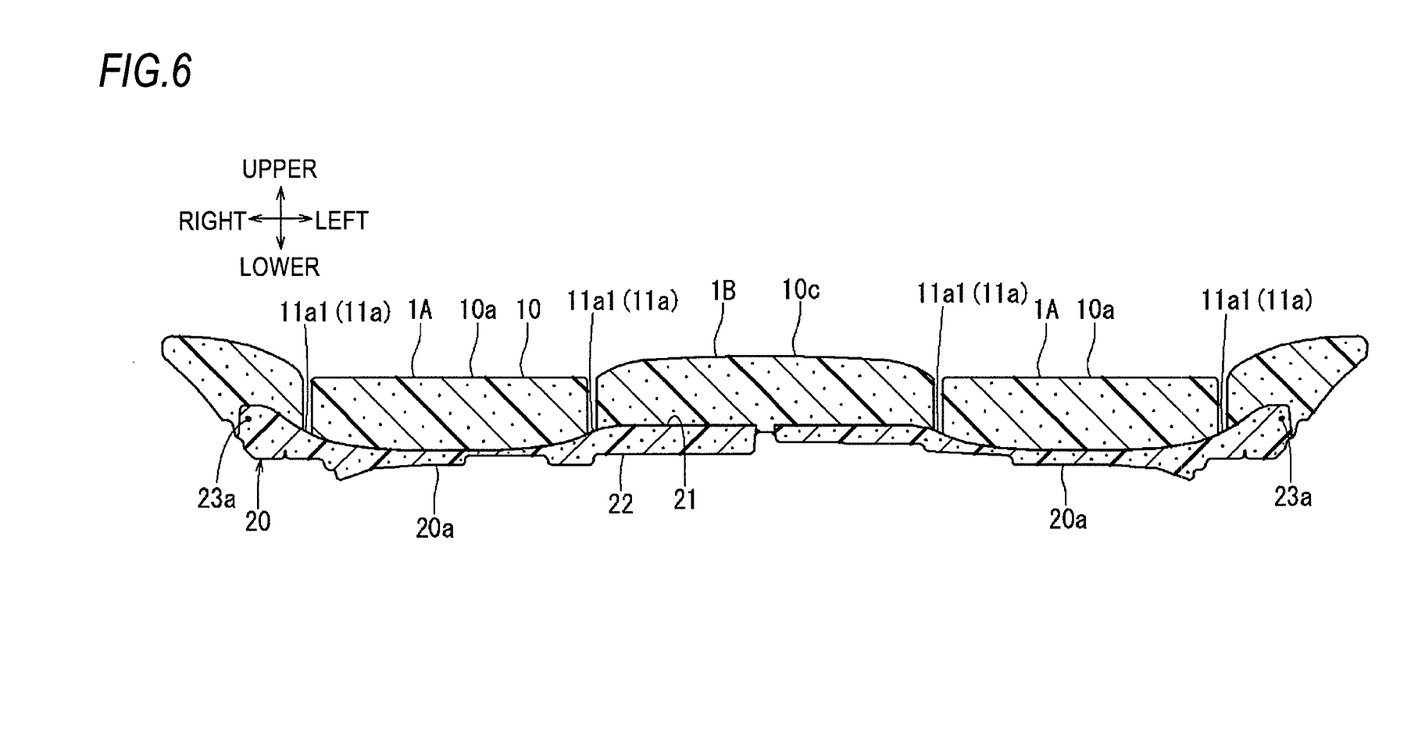
FIG. 6 is a sectional view taken along the line VI-VI in FIG. 3.
Figure 7:
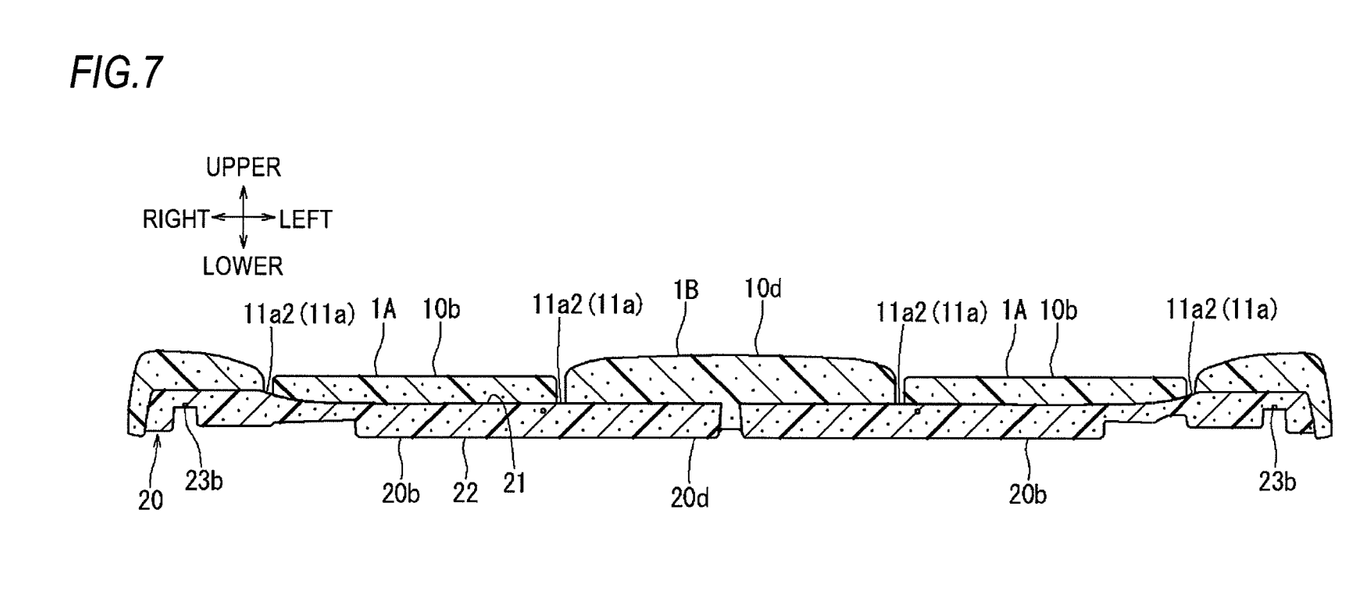
FIG. 7 is a sectional view taken along the line VII-VII in FIG. 3.

The front layer pad 10 is formed of urethane foam obtained by foam-molding polyurethane resin and the density thereof is set to, for example, about 0.05±0.02 g/cm$^3$. The front layer pad 10 includes a front surface portion 11 that has a shape and an area occupying the entire surface on the seating surface side of the cushion pad 1, and a back surface portion 12 that forms a part of the cushion pad 1 on the side opposite to the seating surface. As shown in FIG. 4, the front layer pad 10 is configured such that a buttock support portion 10a which is a portion for supporting a buttock of an occupant seated on each of the left and right seating parts 1A is formed thicker than a thigh support portion 10b which is a portion for supporting a thigh of an occupant seated on each of the left and right seating parts 1A. The buttock support portion 10a having a high seating pressure is more elastically supported than the thigh support portion 10b having a low seating pressure, and thus, the comfort of sitting is improved. Further, as shown in FIG. 6, in the front layer pad 10, the thickness of the buttock support portion 10c of the center seating part 1B is set to be substantially equal to the thickness of the buttock support portion 10a of each of the left and right seating parts 1A. Furthermore, as shown in FIG. 7, in the front layer pad 10, a thigh support portion 10d of the center seating part 1B is formed to have the thickness thicker than the thigh support portion 10b of each of the left and right seating parts 1A. As shown in FIG. 3, a pair of longitudinal grooves 11a extending in the front and rear direction on the left and right sides of each of the left and right seating parts 1A, a rear lateral groove 11b connecting the pair of longitudinal grooves 11a to each other at the rear end portion in a linear manner, and a front lateral groove 11c connecting the pair of longitudinal grooves 11a to each other at the substantially center portion in the front and rear direction in a curved manner bulging forward are formed on the front surface portion 11 of the front layer pad 10. The longitudinal grooves 11a, the rear lateral groove 11b and the front lateral groove 11c are formed in a substantially U shape having a transverse cross-section opened upward. As shown in FIG. 5, in the portions of the longitudinal grooves 11a, a rear hole portion 11a1 is formed as a hole reaching the front side portion 21 of the back layer pad 20 at the portion corresponding to the buttock support portion 10a, and a front hole portion 11a2 is formed as a hole reaching the front side portion 21 of the back layer pad 20 at the portion corresponding to the thigh support portion 10b. Both the rear hole portion 11a1 and the front hole portion 11a2 are formed in such a manner that the width in the left and right direction is substantially equal to the width in the left and right direction of the longitudinal grooves 11a and its length in the front and rear direction is gradually shortened from an upper end portion toward a lower end portion. Although the longitudinal groove 11a positioned on the left side (seat inner side) of the right seating part 1A has been described as a representative of the longitudinal grooves 11a, the rear hole portion 11a1 and the front hole portion 11a2 are similarly provided in the other longitudinal groove 11a. Here, the longitudinal grooves 11a correspond to the "groove" in the claims.

The back layer pad 20 is a bead foam molded product of an olefin resin such as polypropylene or polyethylene and the density thereof is set to about 0.03 g/cm$^3$. The back layer pad 20 is formed to have a lower density and a higher elastic modulus than the front layer pad 10. The volume of the back layer pad 20 is set as about one-third of the total volume of the cushion pad 1.

Figure 2:
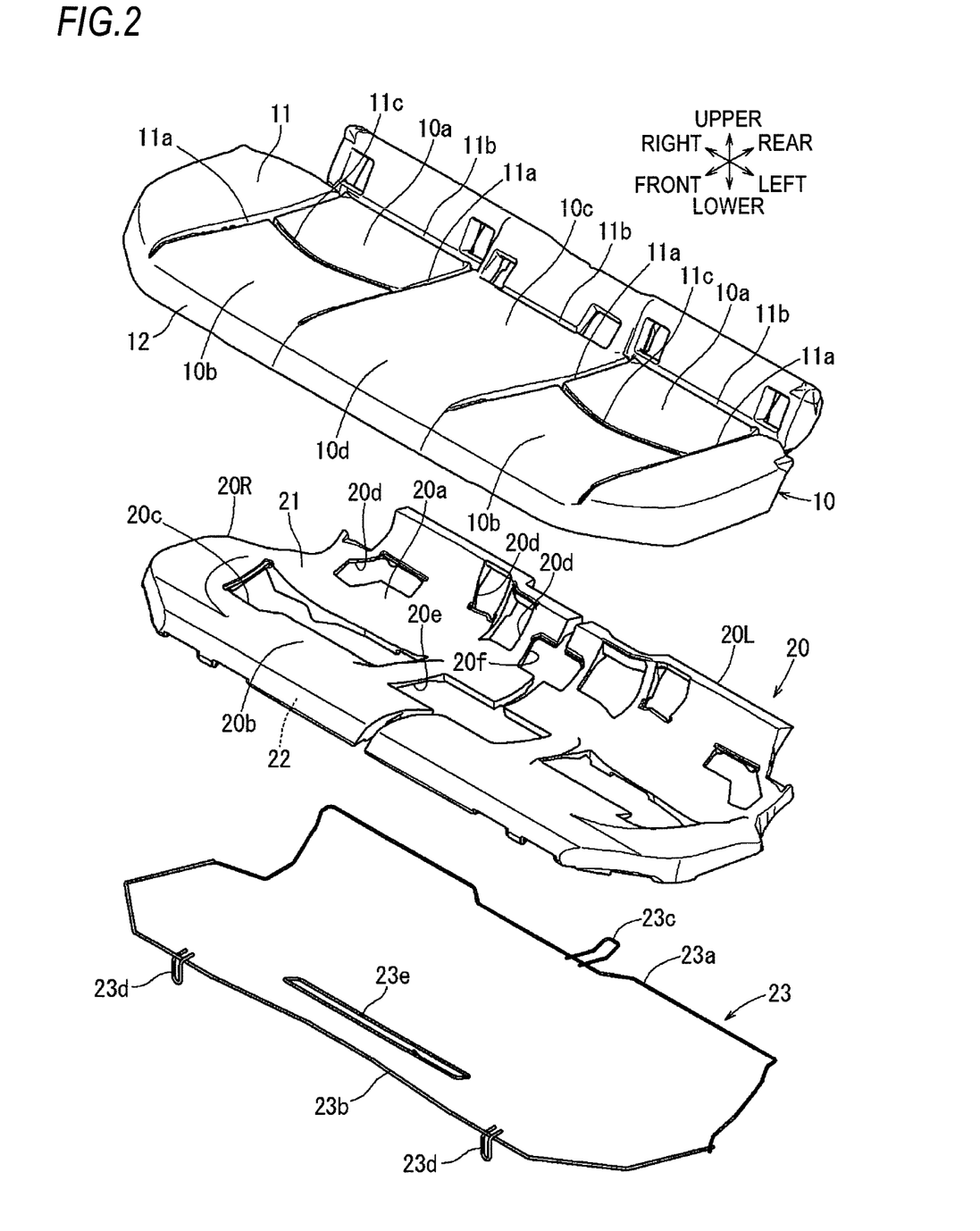
FIG. 2 is an exploded perspective view of the seat cushion material according to the above embodiment.

As shown in FIGS. 2, 4 and 5, in the back layer pad 20, a right back layer pad 20R on the right side and a left back layer pad 20L on the left side are integrated by a frame 23 by insert-molding the frame 23, as will be described later. Since the right back layer pad 20R and the left back layer pad 20L are bilaterally symmetrical with respect to a plane vertically standing with respect to a horizontal plane at the center of the cushion pad 1 in the left and right direction, the right back layer pad 20R will be described as a representative, and the description of the left back layer pad 20L will be omitted. The right back layer pad 20R has the front side portion 21 abutting against a part of the back surface portion 12 of the front layer pad 10, and a back side portion 22 forming a part of the back side of the cushion pad 1. As shown in FIG. 4, the right back layer pad 20R is formed in such a manner that a buttock support portion 20a that is a portion for supporting a buttock of an occupant seated on each of the left and right seating parts 1A is thinner than a thigh support portion 20b that is a portion for supporting a thigh of an occupant seated on each of the left and right seating parts 1A. This is intended to secure a predetermined thickness of the cushion pad 1 so as to correspond to the buttock support portion 10a and the thigh support portion 10b of the front layer pad 10. In the right back layer pad 20R, a central through-hole 20c penetrating in the upper and lower direction is provided between the buttock support portion 20a and the thigh support portion 20b. Further, on the rear portion of the right back layer pad 20R, three rear through-holes 20d penetrating in the upper and lower direction and having different shapes are provided. Furthermore, a central notch 20e is provided on the central portion of the left end portion of the right back layer pad 20R in the front and rear direction, and a rear notch 20f is provided on the rear portion of the left end portion. In this manner, when the front layer pad 10 is integrally foam-molded with respect to the right back layer pad 20R, a part of the front layer pad 10 intrudes into the central through-hole 20c, the rear through-holes 20d, the central notch 20e and the rear notch 20f of the right back layer pad 20R and is foamed and cured therein, thereby forming an exposed back surface portion 12a that is a part of the back surface portion 12 of the front layer pad 10. The exposed back surface portion 12a forms a back side of the cushion pad 1 opposite to the seating surface together with the back side portion 22 of the right back layer pad 20R. When integrally foam-molding the front layer pad 10, the front side portion 21 of the right back layer pad 20R is joined to a joined back surface portion 12b which is a portion other than the exposed back surface portion 12a of the back surface portion 12 of the front layer pad 10. Here, the back side portion 22 corresponds to the "back side surface" in the claims.

As shown in FIGS. 2, 4 and 5, the frame 23 made of an iron wire is inserted inside front, rear, left and right peripheral edge portions of the back layer pad 20. The frame 23 includes a substantially U-shaped rear frame 23a opened forward in a top view, a substantially U-shaped front frame 23b opened rearward in a top view, and one rear locking frame 23c and two front locking frames 23d for locking the cushion pad 1 on a vehicle floor. The rear frame 23a and the front frame 23b are welded and integrated at the opening side end portions thereof, respectively. Further, the rear locking frame 23c is fixed to the rear frame 23a by welding. In addition, the frame 23 includes a connecting frame 23e formed in a rectangular shape in a top view. When performing the bead-foam molding of the back layer pad 20, the frame 23 is integrated by placing the rear frame 23a and the front frame 23b integrated and the connecting frame 23e in predetermined positions inside a die and integrally foam-molding them. The frame 23 not only functions as a framework, but also functions to be held by being attracted by a magnet embedded in an upper cavity surface of an upper die when attaching the back layer pad 20 to the upper cavity surface at the time of molding the cushion pad 1.

Figure 8:
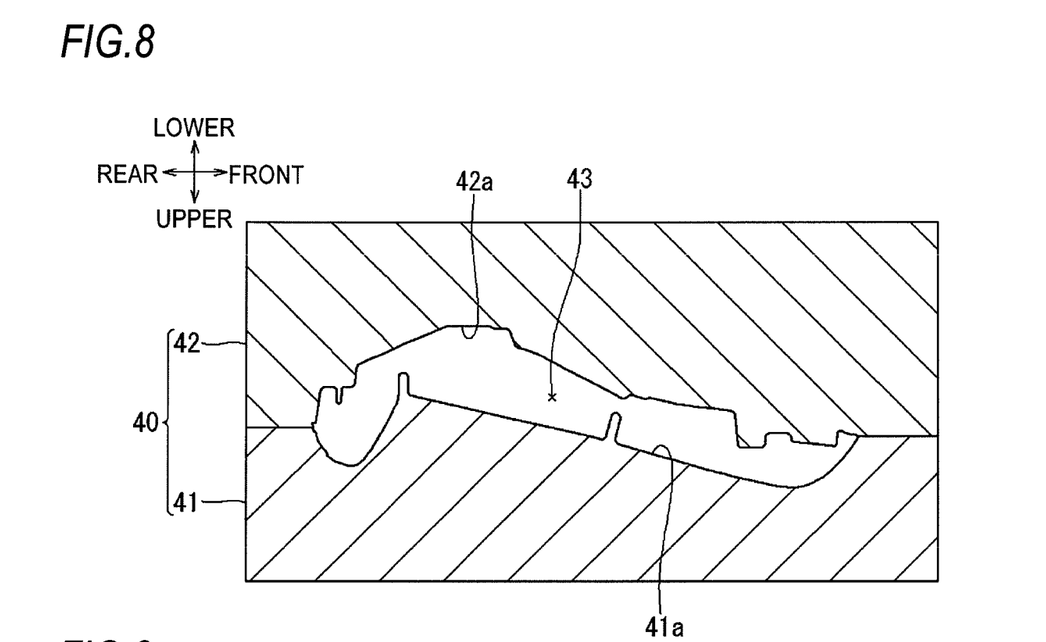

A method for manufacturing the cushion pad 1 will be described with reference to FIGS. 8 to 14. The indication of directions in FIGS. 8 to 14 is consistent with the directions of the cushion pad 1. The back layer pad 20 is molded by the bead-foam molding of an olefin resin in a state where the frame 23 is previously inserted therein. The bead-foam molding refers to a molding method in which pre-foamed beads obtained by pre-foaming raw material beads obtained by impregnating a pellet of an olefin resin with foaming agent are placed in a die cavity and heated by steam, and then the pre-foamed beads are further expanded to have a shape along the die cavity. As shown in FIG. 8, a urethane foam molding die 40 for molding the cushion pad 1 includes a lower die 41 and an upper die 42 that can be opened and closed with respect to the lower die 41. Each of the lower die 41 and the upper die 42 has a die temperature adjustment function for molding the urethane foam resin and a lock mechanism (not shown) for closing the die. A lower cavity surface 41a having a shape corresponding to the front surface portion 11 of the front layer pad 10 which is a front side shape of the cushion pad 1 is formed in the lower die 41. An upper cavity surface 42a having a shape corresponding to the exposed back surface portion 12a of the front layer pad 10 and the back side portion 22 of the back layer pad 20, which are back side shapes of the cushion pad 1, is formed in the upper die 42. In a state where the upper die 42 is closed with respect to the lower die 41, a cavity 43 surrounded by the lower cavity surface 41a and the upper cavity surface 42a is formed between the lower die 41 and the upper die 42. Here, the urethane foam molding die 40 corresponds to the "foam die for manufacturing" in the claims.

Figure 9:
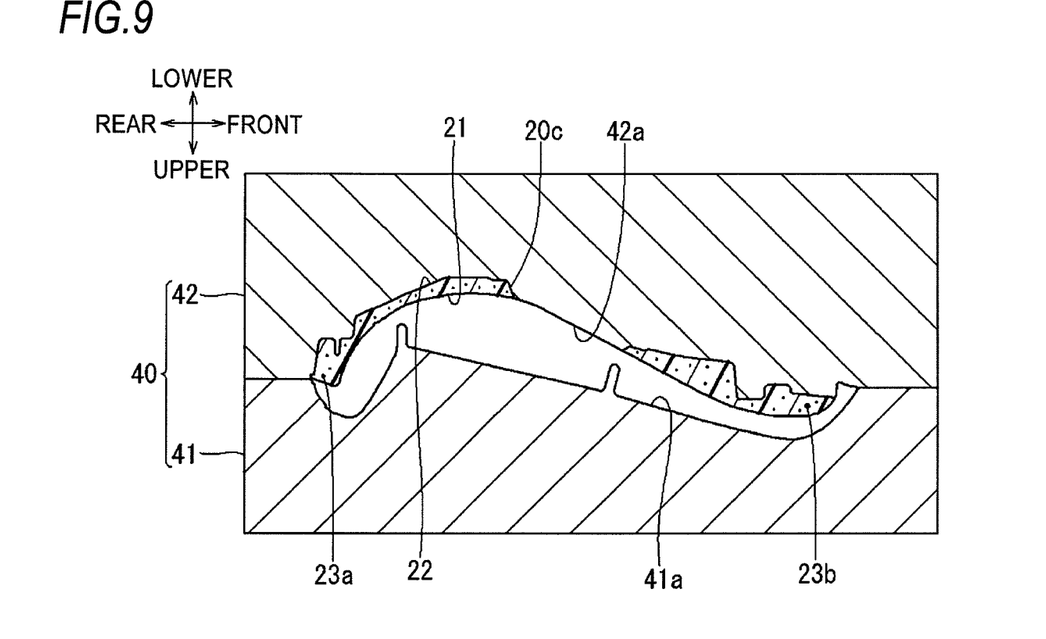
Figure 11:
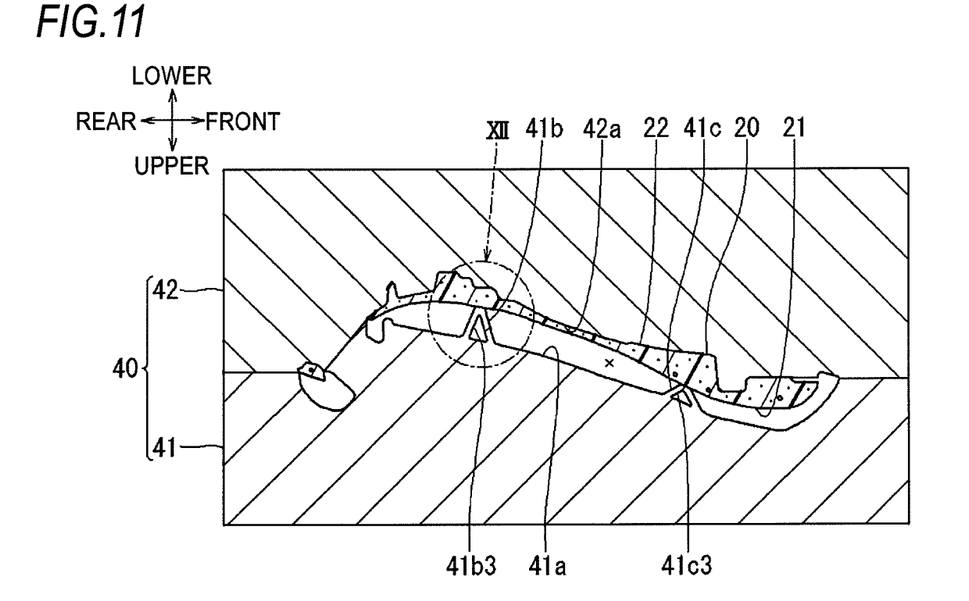
Figure 12:
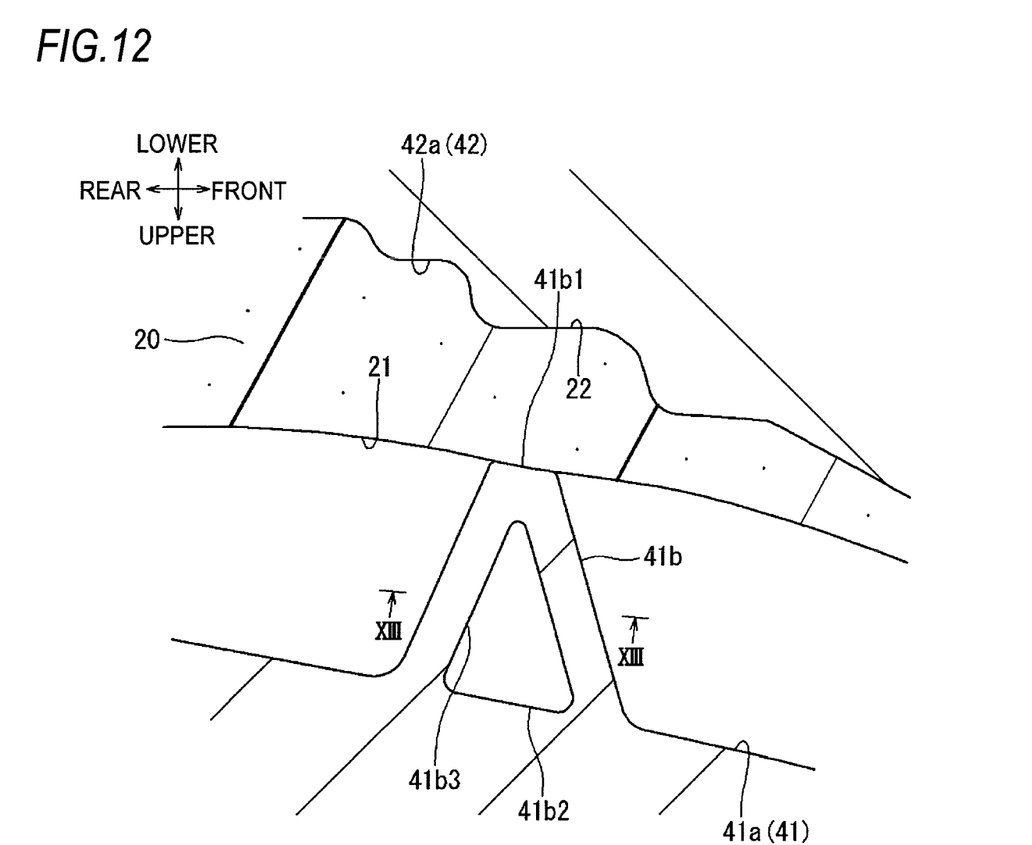
FIG. 12 is an expanded view of the portion XII in FIG. 11.

As shown in FIG. 9, the back side portion 22 of the back layer pad 20 is held by being brought into contact with the upper cavity surface 42a of the upper die 42. A plurality of permanent magnets (not shown) for attracting and holding the frame 23 inserted in the back layer pad 20 by a magnetic force is embedded in predetermined positions of the upper cavity surface 42a. The back layer pad 20 is held on the upper cavity surface 42a by the magnetic force and the concavo-convex fitting between the back side portion 22 and the upper cavity surface 42a. This process corresponds to the "preparing for molding the seat cushion material" in the claims. The state shown in FIG. 9 corresponds to a state in which the upper die 42 to which the back layer pad 20 is attached is closed with respect to the lower die 41. At this time, as shown in FIGS. 11 and 12, the back layer pad 20 is pressed against the upper cavity surface 42a by a rear protrusion 41b and a front protrusion 41c corresponding to the shapes of the rear hole portion 11a1 and the front hole portion 11a2 in the portion of the longitudinal groove 11a. In this manner, in a molding process to be described later, a foamed urethane resin raw material M added on the lower cavity surface 41a hardly intrudes between the back layer pad 20 and the upper cavity surface 42a when the front layer pad 10 is formed by foaming and curing the foamed urethane resin raw material M. Here, the rear protrusion 41b and the front protrusion 41c correspond to the "protrusion" in the claims, respectively.

Figure 13:
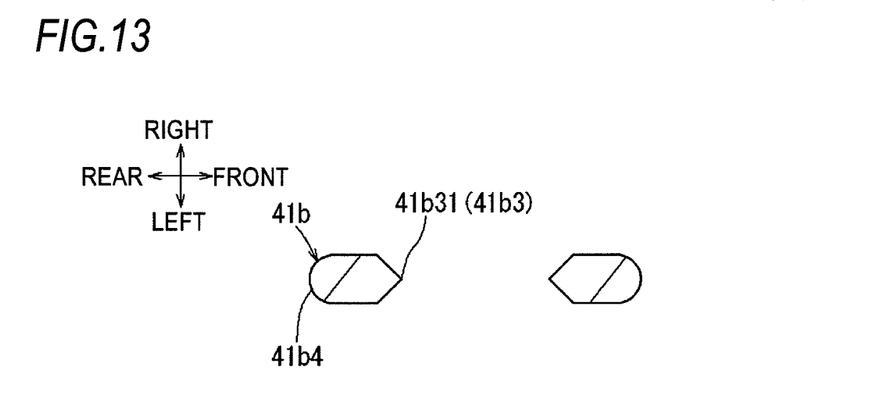
FIG. 13 is a sectional view taken along the line XIII-XIII in FIG. 12.
Figure 14:
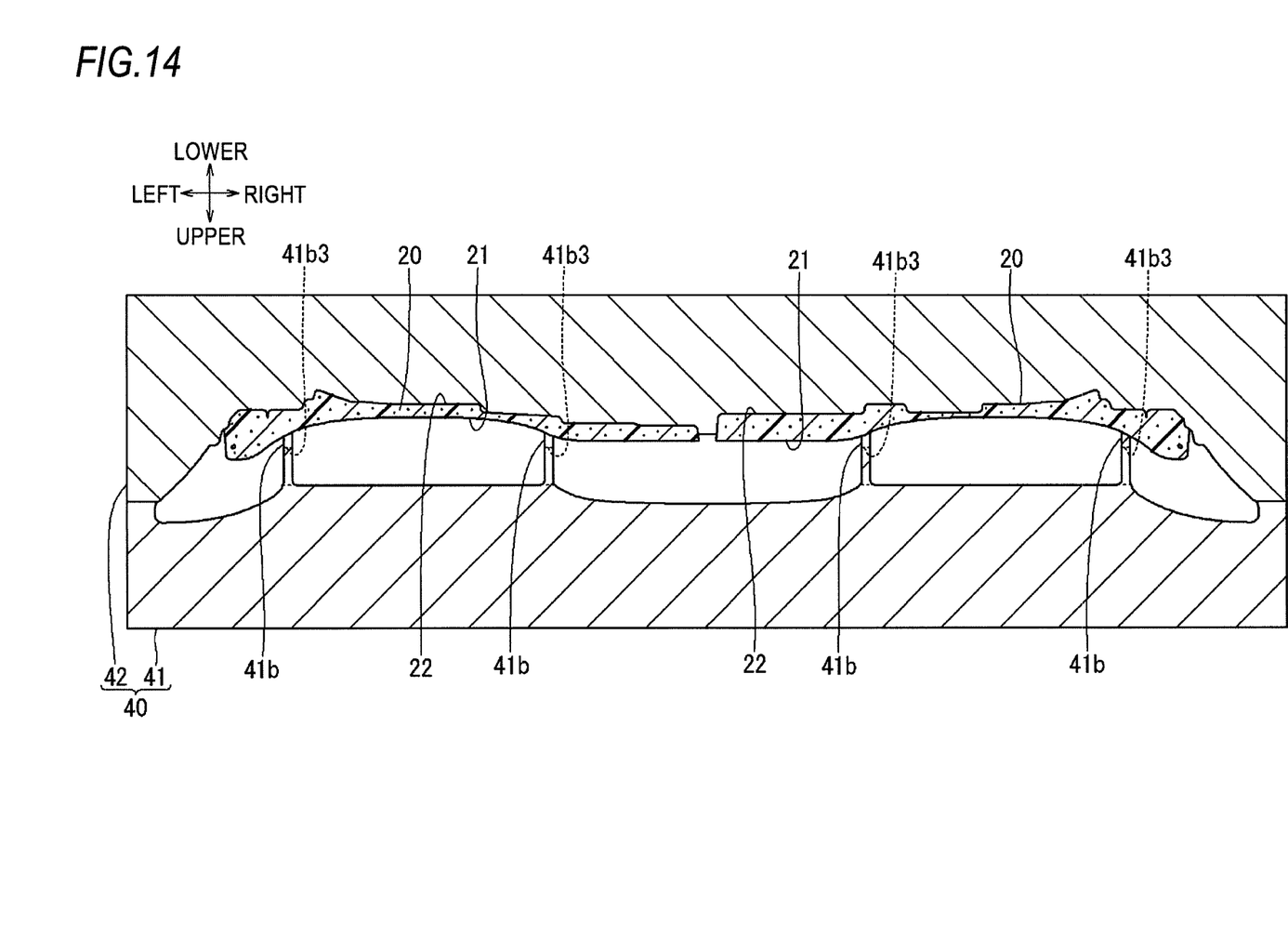

As shown in FIG. 12, the rear protrusion 41b has a substantially trapezoidal shape which has an upper base portion 41b1 on the upper side and a lower base portion 41b2 on the lower side, as viewed from the left and right direction (in a side view). The lower base portion 41b2 is substantially flush with the lower cavity surface 41a. Further, in the left and right direction, the rear protrusion 41b has a plate shape having a thickness substantially equal to a groove width of the longitudinal groove 11a. That is, an outline of the rear protrusion 41b taken along a plane substantially parallel to the lower cavity surface 41a corresponding to the seating surface is formed so that the area decreases from the lower base portion 41b2 toward the upper base portion 41b1. In this way, when the front layer pad 10 is molded between the lower cavity surface 41a and the front side portion 21 of the back layer pad 20, the front layer pad 10 integrated with the back layer pad 20 is easily removed from the lower die 41. Furthermore, the rear protrusion 41b is provided with a substantially triangular through-hole 41b3 which penetrates in the left and right direction and has a vertex at the top, as viewed from the left and right direction. The through-hole 41b3 is provided such that a bottom side portion substantially coincides with the lower base portion 41b2. Further, as shown in FIG. 13, the inner side in the section of the through-hole 41b3 taken along a plane substantially parallel to the lower cavity surface 41a is formed as a narrowed portion 41b31 in which a substantially central portion in the left and right direction (plate thickness direction) approaches each other in the front and rear direction. In the section shown in FIG. 13, the outer side of the rear protrusion 41b in the front and rear direction is formed as a round R-shaped portion 41b4. When the foamed urethane resin raw material M flows while being foamed and cured from the left and right direction of the rear protrusion 41b in the molding process (to be described later) as shown in FIG. 14, the through-hole 41b3 suppresses the occurrence of turbulent flow caused by the contact of the foamed urethane resin raw material M with the rear protrusion 41b, and therefore suppresses the occurrence of defects such as voids. That is, a part of the foamed urethane resin raw material M flows in the left and right direction through the through-hole 41b3. Further, after the foamed urethane resin raw material M is foamed and cured, a part of the front layer pad 10 formed inside the through-hole 41b3 is cut at a portion corresponding to the narrowed portion 41b31 and separated in the left and right direction when the cushion pad 1 is removed from the lower die 41. Therefore, it is possible to make it difficult for a part of the front layer pad 10 to remain inside the through-hole 41b3 as a residue. Although the description of the front protrusion 41c is omitted, the structure thereof is the same as the rear protrusion 41b. Here, the upper base portion 41b1 and the lower haw portion 41b12 correspond to the "leading end portion" and the "connecting portion" in the claims, respectively.

Figure 10:
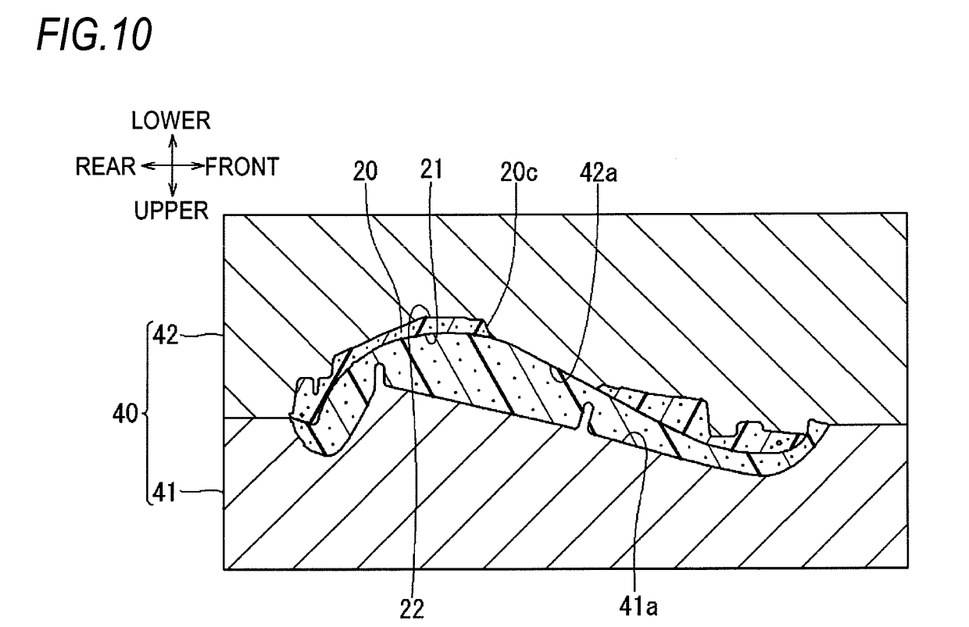

Before the upper die 42 is closed with respect to the lower die 41 as shown in FIG. 9, the foamed urethane resin raw material M is added on the lower cavity surface 41a of the lower die 41, and then, the upper die 42 is closed with respect to the lower die 41 in a state where the back side portion 22 of the back layer pad 20 is held by being brought into contact with the upper cavity surface 42a of the upper die 42 as shown in FIGS. 10 and 11. Then, the foamed urethane resin raw material M is foamed to fill the cavity 43 while increasing its volume. After a predetermined time for a foam curing has passed, the front layer pad 10 is formed. This state is shown in FIGS. 10 and 11, and this process corresponds to the "molding the seat cushion material" in the claims. By this molding process, the front layer pad 10 is formed and integrated with the back layer pad 20, so that the cushion pad 1 is manufactured. At this time, as described above, since the foamed urethane resin raw material M is foamed and cured and a part of the formed urethane resin raw material M flows in the left and right direction through the through-hole 41b3, the occurrence of turbulent flow caused by the contact of the foamed urethane resin raw material M with the rear protrusion 41b is suppressed, and hence, defects such as voids are less likely to occur. Then, the upper die 42 is opened with respect to the lower die 41 and the molded cushion pad 1 is removed from the die. This process corresponds to the "demolding the molded seat cushion material" in the claims. At this time, as described above, since a part of the front layer pad 10 formed inside the through-hole 41b3 is cut at a portion corresponding to the narrowed portion 41b31 and separated in the left and right direction, it is possible to make it difficult for the part of the front layer pad 10 to remain inside the through-hole 41b3 as a residue. Here, the foamed urethane resin raw material M corresponds to the "foamed resin raw material" in the claims.

In the manufacturing process and the foam molding die as described above, the following operational effects are achieved. The foamed urethane resin raw material M is foam-molded in a state where the back layer pad 20 is pressed against the upper cavity surface 42a by the rear protrusion 41b and the front protrusion 41c in the molding process. In this way, the foamed urethane resin raw material M hardly intrudes between the upper cavity surface 42a and the back side portion 22 of the back layer pad 20 in the process of foaming and curing the foamed urethane resin raw material M, so that it is possible to suppress the formation of unnecessary foams on the side of the back side portion 22 of the back layer pad 20.

Further, the rear protrusion 41b and the front protrusion 41c are formed as plate-shaped members, each of which corresponds to a position of the longitudinal groove 11a and has a width substantially the same as a width in the left and right direction of the longitudinal groove 11a. In this way, since the rear hole portion 11a1 and the front hole portion 11a2 formed in the front layer pad 10 by the rear protrusion 41b and the front protrusion 41c after demolding the cushion pad 1 are hidden in the longitudinal groove 11a and do not appear in the general part, it is possible to suppress the adverse influence on the appearance or tactile sensation when a cover is attached to the cushion pad 1.

Furthermore, the rear protrusion 41b and the front protrusion 41c are formed in such a manner that the length in the front and rear direction of the outline of the section taken along a plane substantially parallel to the lower cavity surface 41a is gradually decreased from the lower base portion 41b2 connected to the lower cavity surface 41a to the upper base portion 41b1 in contact with the back layer pad 20. In this way, it is easy to remove the molded cushion pad 1 from the lower die 41. Further, since the through-hole 41b3 and a through-hole 41c3 penetrating in the left and right direction (plate thickness direction) are provided in the rear protrusion 41b and the front protrusion 41c, respectively, it is possible to make it difficult for the rear protrusion 41b and the front protrusion 41c to inhibit the flow in an in-plane direction of the added foamed urethane resin raw material M on the lower cavity surface 41a, thereby preventing defects such as voids from occurring in the vicinity of the rear protrusion 41b and the front protrusion 41c.

In addition, in the sections of the through-hole 41b3 and the through-hole 41c3 taken along planes substantially parallel to the lower cavity surface 41a, the substantially central portions in the left and right direction (plate thickness direction) of the rear protrusion 41b and the front protrusion 41c are formed as the narrowed portion 41b31 (description for the front protrusion 41c is omitted) which is the narrowest. In this way, even when the foamed urethane resin raw material M is foamed and cured in the through-hole 41b3 and the through-hole 41c3, the cushion pad 1 is stably cut at the narrowed portion 41b31 (description for the front protrusion 41c is omitted) during the demolding of the molded cushion pad 1. Therefore, it is possible to suppress a part of the front layer pad 10 from being torn and remaining in the through-hole 41b3 and the through-hole 41c3. Further, it is possible to improve the workability of the demolding process.

Although specific embodiments have been described above, the disclosure is not limited to the configurations in these embodiments, and various modifications, additions and deletions can be made without changing the spirit of the disclosure. For example, the following configurations can be adopted.

1. In the above embodiment, the rear protrusion 41b and the front protrusion 41c are provided only in the portions corresponding to the longitudinal grooves 11a. However, protrusions may be provided in the portions corresponding to the rear lateral groove 11b and the front lateral groove 11c. Further, the number of protrusions may be appropriately increased or decreased depending on the pressed portions.

2. In the above embodiment, each of the through-hole 41b3 and the through-hole 41c3 is formed in a substantially triangular shape having a vertex at the top, as viewed from the left and right direction. However, the shape of the through-hole is not limited thereto. For example, the through-hole may have a suitable shape such as a rectangular shape or a circular shape as viewed from the left and right direction, so long as the through-hole penetrates in the plate thickness direction in the vicinity of the lower base portion 41b2.

3. In the above embodiment, the disclosure is applied to an automobile seat cushion. However, the disclosure may be applied to an automobile seat back or may be applied to a seat mounted on an airplane, a ship, a train, or the like.

The disclosure provides illustrative, non-limiting examples as follows:

A first aspect of the present disclosure is a method for manufacturing a seat cushion material, the seat cushion material including a front layer part disposed on a seating surface side, and a back layer part disposed on a side of the front layer part opposite to the seating surface and having a higher rigidity and a lower density than the front layer part, the seat cushion material having a layered structure in which the front layer part and the back layer part are integrated, and the back layer part having a back side surface constituting at least a part of the surface on the side of the seat cushion material opposite to the seating surface, the method including: preparing for molding the seat cushion by attaching the back layer part to an upper die having an upper cavity surface corresponding to the surface on the side of the seat cushion material opposite to the seating surface in such a manner that the back side surface is brought into contact with the upper cavity surface; molding the seat cushion material by adding foamed resin raw material forming the front layer part on a lower cavity surface of a lower die, and then by closing the upper die to which the back layer part is attached so as to integrate the front layer part with the back layer part, the lower cavity surface of the lower die corresponds to the surface on the seating surface side of the seat cushion material and the lower cavity surface is provided with a plurality of protrusions which is configured to be brought into contact with the seating surface side of the back layer part and is configured to press the back layer part against the upper cavity surface when the upper die to which the back layer part is attached is closed with respect to the lower die; and demolding the molded seat cushion material.

According to the first aspect, the foamed resin raw material is foam-molded in a state where the back layer part is pressed against the upper cavity surface by the protrusions in the molding process. In this way, the foamed resin raw material hardly intrudes between the upper cavity surface and the back side surface of the back layer part in the process of foaming and curing the foamed resin raw material, so that it is possible to suppress the formation of unnecessary foams on the side of the back side surface of the back layer part.

A second aspect of the present disclosure is characterized in that in the first aspect, each of the plurality of protrusions is formed as a plate-shaped member which corresponds to a position of a groove of the front layer part which is recessed in a direction opposite to the seating surface provided on the seating surface side of the front layer part and which has a width substantially the same as a width of the groove.

According to the second aspect, each of the plurality of protrusions is formed as the plate-shaped member which corresponds to a position of the groove and has a width substantially the same as the width of the groove. Therefore, the concave portions formed in the front layer part by the protrusions after demolding the seat cushion material are hidden in the groove and do not appear in the general part, so that it is possible to suppress the adverse influence on the appearance or tactile sensation when a cover is attached to the seat cushion material.

A third aspect of the present disclosure is characterized in that in the second aspect, each of the plurality of protrusions is formed in such a manner that an outer shape area of a section taken along a plane parallel to the seating surface is gradually decreased from a connecting portion of each of the plurality of the protrusions connected to the lower cavity surface to a leading end portion of each of the plurality of the protrusions in contact with the back layer part, and a through-hole penetrating in a plate thickness direction is provided in the vicinity of the connecting portion.

According to the third aspect, since each of the plurality of protrusions are formed in such a manner that the outer shape area of the section taken along the plane parallel to the seating surface is gradually decreased from the connecting portion of each of the plurality of protrusions connected to the lower cavity surface to the leading end portion of each of the plurality of protrusions in contact with the back layer part, it is easy to demold the molded seat cushion material. Further, since the through-hole penetrating in the plate thickness direction is provided in the vicinity of the connecting portion, it is possible to make it difficult for each of the plurality of protrusions to inhibit the flow in an in-plane direction of the added foamed resin raw material on the lower cavity surface, thereby preventing defects such as voids from occurring in the vicinity of each of the plurality of protrusions.

A fourth aspect of the present disclosure is characterized in that in the third aspect, a section of the through-hole taken along the plane parallel to the seating surface is formed in a shape that is the narrowest at substantially central portion of each of the plurality of protrusions in the plate thickness direction.

According to the fourth aspect, even when the foamed resin raw material is foamed and cured in the through-hole, the seat cushion material is stably cut at the narrowed portion during the demolding of the molded seat cushion material. Therefore, it is possible to suppress a part of the foamed body from being torn and remaining in the through-hole. In this way, it is possible to improve the workability of the demolding process.

A fifth aspect of the present disclosure is characterized in that in the third aspect, each of the plurality of protrusions has a trapezoidal shape.

A sixth aspect of the present disclosure is a foam die for manufacturing a seat cushion material, the seat cushion material including a front layer part disposed on a seating surface side, and a back layer part disposed on a side of the front layer part opposite to the seating surface and having a higher rigidity and a lower density than the front layer part, the seat cushion material having a layered structure in which the front layer part and the back layer part are integrated, and the back layer part having a back side surface constituting at least a part of the surface on the side of the seat cushion material opposite to the seating surface, the foam die including: an upper die having an upper cavity surface which corresponds to the surface on the side of the seat cushion material opposite to the seating surface and to which the back layer part can be attached in such a manner that the back side surface is configured to be brought into contact with the upper cavity surface; and a lower die having a lower cavity surface corresponding to the surface on the seating surface side of the seat cushion material, the lower cavity surface being provided with a plurality of protrusions which is configured to be brought into contact with the seating surface side of the back layer part and is configured to press the back layer part against the upper cavity surface when the upper die to which the back layer part is attached is closed with respect to the lower die, and foamed resin raw material forming the front layer part is added on the lower cavity surface and the upper die to which the back layer part is attached is closed so as to integrate the front layer part with the back layer part.

According to the sixth aspect, the foamed resin raw material can be foam-molded in a state where the back layer part is pressed against the upper cavity surface by the plurality of protrusions in the process of foam-molding the foamed resin raw material. In this way, it is possible to mold the seat cushion material in which the foamed resin raw material hardly intrudes between the upper cavity surface and the back side surface of the back layer part in the process of foaming and curing the foamed resin raw material and the formation of unnecessary foams on the side of the back side surface of the back layer part can be suppressed.

A seventh aspect of the present disclosure is characterized in that in the sixth aspect, each of the plurality of protrusions is formed as a plate-shaped member which corresponds to a position of a groove of the front layer part which is recessed in a direction opposite to the seating surface provided on the seating surface side of the front layer part and which has a width substantially the same as a width of the groove.

According to the seventh aspect, since each of the plurality of protrusions is formed as a plate-shaped member which corresponds to the position of the groove and has a width substantially the same as the width of the groove, the concave portions formed in the front layer part by the plurality of protrusions after demolding the seat cushion material are hidden in the groove and do not appear in the general part. In this way, it is possible to mold the seat cushion material in which the adverse influence on the appearance or tactile sensation is suppressed when a cover is attached to the seat cushion material.

An eighth aspect of the present disclosure is characterized in that in the seventh aspect, each of the plurality of protrusions are formed in such a manner that an outer shape area of a section taken along a plane parallel to the seating surface is gradually decreased from a connecting portion of each of the plurality of the protrusions connected to the lower cavity surface to a leading end portion of each of the plurality of the protrusions in contact with the back layer part, and a through-hole penetrating in a plate thickness direction is provided in the vicinity of the connecting portion.

According to the eighth aspect, since the each of the plurality of protrusions is formed in such a manner that the outer shape area of the section taken along the plane parallel to the seating surface is gradually decreased from the connecting portion of each of the plurality of the protrusions connected to the lower cavity surface to the leading end portion of each of the plurality of the protrusions in contact with the back layer part, it is easy to demold the molded seat cushion material. Further, the through-hole penetrating in the plate thickness direction is provided in the vicinity of the connecting portion. Therefore, it is possible to mold the seat cushion material in which the each of plurality of protrusions hardly inhibits the flow in an in-plane direction of the added foamed resin raw material on the lower cavity surface and defects such as voids are prevented from occurring in the vicinity of the protrusions.

A ninth aspect of the present disclosure is characterized in that in the eighth aspect, a section of the through-hole taken along the plane parallel to the seating surface is formed in a shape that is the narrowest at substantially central portions of each of the plurality of protrusions in the plate thickness direction.

According to the ninth aspect, even when the foamed resin raw material is foamed and cured in the through-hole, the seat cushion material is stably cut at the narrowed portion during the demolding of the molded seat cushion material. Therefore, it is possible to suppress a part of the foamed body from being torn and remaining in the through-hole. In this way, it is possible to demold the molded seat cushion material with good workability.

A tenth aspect of the present disclosure is characterized in that in the eighth aspect, each of the plurality of protrusions has a trapezoidal shape.

What is claimed is:

1. A method for manufacturing a seat cushion material, the method comprising:
    providing a back layer part having a back side surface and an opposite inner surface:
    attaching the back side surface of the back layer part to an upper die having an upper cavity with an upper cavity surface, the upper cavity surface corresponding to a back surface of the seat cushion material, the attaching being performed in such a manner that the back side surface of the back layer part is brought into contact with the upper cavity surface;
    adding resin foam raw material to a lower die having a lower cavity with a lower cavity surface, the lower cavity surface corresponding to a seating surface of the seat cushion material;
    after the attaching, closing the upper and lower dies to enclose the upper and lower cavities therebetween;
    foaming the resin foam raw material to form a front layer part, the foaming being performed so as to integrate the front layer part with the back layer part and to provide the front layer part with a seating surface corresponding to the seating surface of the seat cushion material, the back layer part having a higher rigidity and a lower density than the front layer part,
    wherein the lower cavity surface of the lower die is provided with a plurality of protrusions which are brought into contact with the inner surface of the back layer part and press the back layer part against the upper cavity surface of the upper die when the upper and lower dies are closed, the foaming producing the seat cushion material; and
    demolding the seat cushion material.

2. The method for manufacturing the seat cushion material according to claim 1,
    wherein each of the plurality of protrusions is a plate-shaped member which is located in a respective position on the lower cavity surface of the lower die which corresponds to a position of a respective groove formed in the seating surface of the front layer part, each respective groove being recessed in a direction toward the back layer part, and
    wherein each of the plurality of protrusions has a width substantially the same as a width of each respective groove.

3. The method for manufacturing the seat cushion material according to claim 2,
   wherein each of the plurality of protrusions has a shape such that an outer shape area of a cross-section taken along a plane perpendicular to a length of each respective protrusion gradually decreases from a respective connecting portion, where each respective protrusion is connected to the lower cavity surface of the lower die, to a respective leading end portion which contacts the back layer part when the upper and lower dies are closed, and
   wherein each of the plurality of protrusions has a respective through-hole penetrating in a respective plate thickness direction in the vicinity of the respective connecting portion.

4. The method for manufacturing the seat cushion material according to claim 3,
   wherein a cross-section of each respective through-hole of the plurality of protrusions taken along a plane perpendicular to the length of each respective protrusion has a shape that is the narrowest at a respective substantially central portion of each of the plurality of protrusions in the respective plate thickness direction.

5. The method for manufacturing the seat cushion material according to claim 3,
   wherein each of the plurality of protrusions has a trapezoidal shape.

\* \* \* \* \*